(12) United States Patent
Xiao (10) Patent No.: US 12,032,251 B2
(45) Date of Patent: Jul. 9, 2024

(54) DISPLAY PANEL

(71) Applicant: TCL China Star Optoelectronics Technology Co., Ltd., Shenzhen (CN)

(72) Inventor: Bangqing Xiao, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/431,155

(22) PCT Filed: Jun. 29, 2021

(86) PCT No.: PCT/CN2021/103171
§ 371 (c)(1),
(2) Date: Aug. 14, 2021

(87) PCT Pub. No.: WO2022/252323
PCT Pub. Date: Dec. 8, 2022

(65) Prior Publication Data
US 2024/0012299 A1    Jan. 11, 2024

(30) Foreign Application Priority Data

May 31, 2021    (CN) ........................ 202110600442.X (51) Int. Cl.
*G02F 1/1345*    (2006.01)
*G02F 1/1362*    (2006.01)
*G09G 3/36*    (2006.01)

(52) U.S. Cl.
CPC .... *G02F 1/13454* (2013.01); *G02F 1/136222* (2021.01); *G02F 1/136286* (2013.01); *G09G 3/3674* (2013.01); *G09G 2300/0408* (2013.01)

(58) Field of Classification Search
CPC .......... G02F 1/13454; G02F 1/136222; G02F 1/136286; G09G 3/3674; G09G 2300/0408
See application file for complete search history.

(56) References Cited

U.S. PATENT DOCUMENTS

| 11,694,646 | B2* | 7/2023 | Gao ................... G02F 1/13454 345/204 |
| 2017/0184888 | A1* | 6/2017 | Sakamoto ......... G02F 1/133308 |
| 2017/0200420 | A1* | 7/2017 | No ....................... G06F 13/1689 |
| 2017/0213497 | A1 | 7/2017 | Shang et al. |

(Continued)

FOREIGN PATENT DOCUMENTS

| CN | 105807523 A | 7/2016 |
| CN | 108398839 A | 8/2018 |

(Continued)

*Primary Examiner* — Chineyere D Wills-Burns
*Assistant Examiner* — Cory A Almeida
(74) *Attorney, Agent, or Firm* — Nathan & Associates; Menachem Nathan (57) ABSTRACT

The application discloses a display panel. The display panel includes: a dataline black matrix less (DBS) common electrode trace arranged in a routing area; a plurality of clock signal traces arranged in a first wiring area along a first direction; and a plurality of clock signal transfer lines connected to the plurality of clock signal traces in a one-to-one correspondence, wherein each of the clock signal transfer lines passes through the routing area and extends to a gate driver on array (GOA) unit area along the first direction, and at least one of the clock signal transfer lines is bent and arranged in the routing area.

16 Claims, 8 Drawing Sheets

(56) References Cited

U.S. PATENT DOCUMENTS

| | | | | |
|---|---|---|---|---|
| 2020/0004092 A1* | 1/2020 | Ren | .................. | H01L 27/124 |
| 2020/0410951 A1* | 12/2020 | Shin | .................. | G02F 1/136286 |
| 2021/0335174 A1* | 10/2021 | Lin | .................. | G09G 3/20 |
| 2023/0092089 A1* | 3/2023 | Zhang | .................. | G02F 1/133388 |
| | | | | 257/91 |

FOREIGN PATENT DOCUMENTS

| | | | | | |
|---|---|---|---|---|---|
| CN | 109801587 A | | 5/2019 | | |
| CN | 110058469 A | * | 7/2019 | ....... | G02F 1/133345 |
| CN | 110518019 A | | 11/2019 | | |
| CN | 110888277 A | | 3/2020 | | |
| CN | 111090202 A | | 5/2020 | | |
| CN | 111091792 A | | 5/2020 | | |
| CN | 111384066 A | | 7/2020 | | |
| CN | 111445831 A | | 7/2020 | | |
| CN | 111624827 A | | 9/2020 | | |

\* cited by examiner

DISPLAY PANEL

BACKGROUND OF INVENTION

Field of Invention

The present application relates to the field of display panel technology, and in particular to a display panel.

Description of Prior Art

The higher the resolution of a liquid crystal display (LCD), the more the clock signals (CK) of a gate driver on array (GOA) circuit are required. Meanwhile, there are differences in capacitance and resistance between different CK lines of 8K products, which is prone to produce horizontal line defects. In the prior art, the CK line routing design is configured to reduce the resistance difference. However, the CK line routing will increase a width of a bezel, which is not conducive to development of a narrow bezel of the liquid crystal display.

An embodiment of the present application provides a display panel, which can reduce a width of a bezel of the display panel while reducing resistance difference between clock signal traces.

SUMMARY OF INVENTION

An embodiment of the present application provides a display panel including a non-display area, the non-display area including a gate driver on array (GOA) unit area, a routing area, and a first wiring area arranged in a first direction; and the display panel including:
   a dataline black matrix less (DBS) common electrode trace arranged in the
   routing area and extending along a second direction;
   a plurality of clock signal traces arranged in the first wiring area along the first direction, wherein each of the clock signal traces extends along the second direction; and
   a plurality of clock signal transfer lines connected to the plurality of clock signal traces in a one-to-one correspondence, wherein each of the clock signal transfer lines passes through the routing area and extends to the GOA unit area along the first direction, and at least one of the clock signal transfer lines is bent and arranged in the routing area,
   wherein the plurality of clock signal transfer lines, the DBS common electrode trace, and the plurality of clock signal traces are arranged at different layers.

Optionally, an overlap area between each of the clock signal transfer lines and the DBS common electrode trace in the routing area is same.

Optionally, the closer the clock signal traces are to the GOA unit area, the greater a bending length of the clock signal transfer lines connected to the clock signal traces in the routing area is.

Optionally, an orthographic projection of the DBS common electrode trace on the routing area completely covers the routing area, and the DBS common electrode trace is provided with a hollow area; and
   wherein the closer the clock signal traces are to the GOA unit area, the larger an overlap area between the clock signal transfer lines connected to the clock signal traces and the hollow area is.

Optionally, the hollow area includes a plurality of hollow structures arranged along the second direction, and each of the clock signal transfer lines corresponds to at least one of the hollow structures; and
   wherein the closer the clock signal traces are to the GOA unit area, the greater a number of the hollow structures corresponding to the clock signal transfer lines connected to the clock signal traces is.

Optionally, the hollow area includes a plurality of hollow structures arranged along the second direction, and each of the clock signal transfer lines corresponds to one of the hollow structures; and
   wherein the closer the clock signal traces are to the GOA unit area, the larger an area of the hollow structures corresponding to the clock signal transfer lines connected to the clock signal traces is.

Optionally, the display panel further includes a color filter (CF) common electrode trace and a color filter (CF) common electrode feedback trace; and
   wherein the CF common electrode trace and the CF common electrode feedback trace are both arranged in the first wiring area and extend along the second direction.

Optionally, the non-display area further includes a second wiring area located between the GOA unit area and the routing area;
   wherein the display panel further includes a voltage trace and a voltage transfer line; and
   wherein the voltage trace is arranged in the second wiring area and extends along the second direction, the voltage transfer line is connected to the voltage trace and extends to the GOA unit area along the first direction, and the voltage trace and the voltage transfer line are arranged at different layers.

Optionally, the display panel further includes a positive signal trace, a positive signal transfer line, a negative signal trace, and a negative signal transfer line;
   wherein the positive signal trace and the negative signal trace are both arranged in the second wiring area and extend along the second direction; and
   wherein the positive signal transfer line is connected to the positive signal trace and extends to the GOA unit area along the first direction, and the positive signal transfer line and the positive signal trace are arranged at different layers; and
   wherein the negative signal transfer line is connected to the negative signal trace and extends to the GOA unit area along the first direction, and the negative signal trace and the negative signal transfer line are arranged at different layers.

Optionally, the clock signal traces include a plurality of sub-lines that are cross-connected, and the plurality of sub-lines form a mesh structure.

Optionally, each of the CF common electrode trace and the CF common electrode feedback trace includes a plurality of sub-lines that are cross-connected, and the plurality of sub-lines form a mesh structure.

Optionally, the voltage trace includes a plurality of sub-lines that are cross-connected, and the plurality of sub-lines form a mesh structure.

Optionally, each of the positive signal trace and the negative signal trace includes a plurality of sub-lines that are cross-connected, and the plurality of sub-lines form a mesh structure.

Optionally, the DBS common electrode trace and the plurality of clock signal traces are arranged at a same layer.

Optionally, the CF common electrode trace, the CF common electrode feedback trace, and the clock signal trace are arranged at a same layer.

Optionally, the voltage trace and the clock signal trace are located at a same layer, and the voltage transfer line and the clock signal transfer lines are located at a same layer.

Optionally, the positive signal trace, the negative signal trace, and the clock signal traces are located at a same layer, and the positive signal transfer line, the negative signal transfer line, and the clock signal transfer lines are located at a same layer.

Beneficial effect of the present application is that a dataline black matrix less (DBS) common electrode trace is arranged in the routing area and extending along a second direction; a plurality of clock signal traces are arranged in the first wiring area along a first direction, wherein each of the clock signal traces extends along the second direction; and a plurality of clock signal transfer lines are connected to the plurality of clock signal traces in a one-to-one correspondence, wherein each of the clock signal transfer lines passes through the routing area and extends to the GOA unit area along the first direction, and at least one of the clock signal transfer lines is bent and arranged in the routing area, such that a difference in resistance between the clock signal traces is reduced through the bending of the clock signal transfer lines. Meanwhile, the DBS common electrode trace is located in the routing area to prevent disposing the DBS common electrode traces separately to increase routing space, thereby reducing a width of a bezel of a display panel.

BRIEF DESCRIPTION OF DRAWINGS

The technical solutions and other beneficial effects of the present application will be made obvious by describing the specific implementation manners of the present application in detail below in conjunction with the accompanying drawings.

DETAILED DESCRIPTION OF PREFERRED EMBODIMENTS

The specific structural and functional details disclosed herein are merely representative and are for the purpose of describing exemplary embodiments of the present application. However, the present application may be embodied in many alternative forms and should not be construed as limited to the embodiments set forth herein.

In the description of the present disclosure, it is to be understood that the terms "center", "lateral", "upper", "lower", "left", "right", "vertical", "horizontal", "top", "bottom", "inside", "outside" and the like are based on the orientation or positional relationship shown in the drawings, and is merely for the convenience of describing the present disclosure and simplifying the description, and does not indicate or imply that the indicated devices or components must to be in particular orientations, or constructed and operated in a particular orientation, and thus are not to be construed as limiting the disclosure. Furthermore, the terms "first", "second", etc. in the specification and claims of the present disclosure and the above figures are used to distinguish similar objects, and are not necessarily used to describe a specific order or prioritization. It should be understood that the objects so described are interchangeable when it is appropriate. Moreover, the terms "including" and "having" and any variations thereof are intended to cover a non-exclusive "inclusion".

In the description of this application, it should be noted that the terms "installation", "connected", and "connected" should be understood in a broad sense unless explicitly stated and limited otherwise. For example, it can be a fixed connection, a detachable connection, or an integral connection; it can also be a mechanical connection or an electrical connection; it can be a direct connection; or it can be an indirect connection through an intermediate medium; or it can be a communication between two components.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "includes," "including," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

The present application will be further described below in conjunction with the drawings and embodiments.

Figure 2:
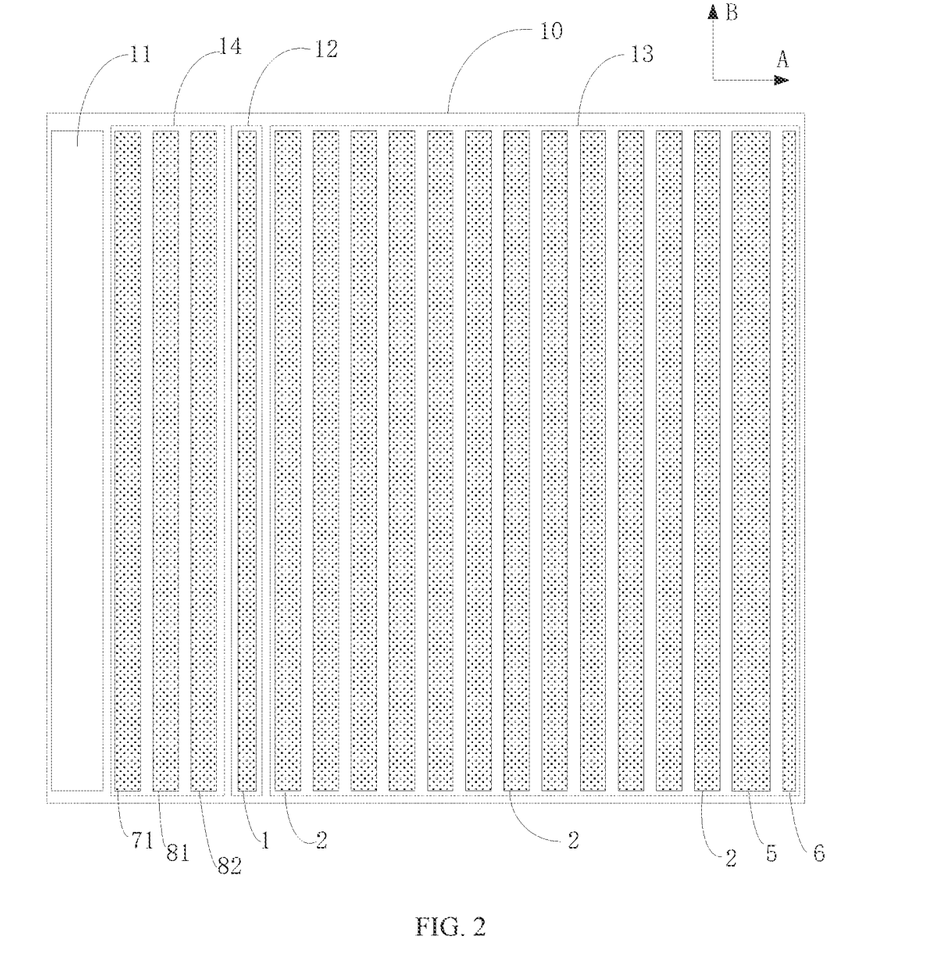
FIG. 2 is a schematic diagram of a first structure of a first metal layer of a display panel provided by an embodiment of the present application.

Refer to FIG. 2, which is a schematic structural diagram of a display panel provided by an embodiment of the present disclosure.

The display panel provided by the embodiment of the present disclosure includes a display area (not shown) and at least one non-display area 10. If the display panel adopts a single drive mode, the display panel includes one non-display area 10, and the non-display area 10 is located on one side of the display area; if the display panel adopts a dual drive mode, the display panel includes two non-display areas 10, and the two non-display areas 10 are located on opposite sides of the display area.

As shown in FIG. 2, the non-display area 10 includes a gate driver on array (GOA) unit area 11, a routing area 12, and a first wiring area 13, and the GOA unit area 11, the routing area 12, and the first wiring area 13 are arranged in sequence along a first direction A. The GOA unit area 11 is arranged close to the display area, that is, the GOA unit area 11 is located between the display area and the routing area 12.

The display panel includes a GOA unit (not shown), and the GOA unit is located in the GOA unit area 11. The display panel also includes a dataline black matrix less (DBS) common electrode trace 1, and the DBS common electrode trace 1 is located in the routing area 12 and extends along a second direction B. The display panel also includes a plurality of clock signal traces 2, the plurality of clock signal traces 2 are sequentially arranged in the first wiring area 13 along the first direction A, and each of the clock signal traces 2 extends along the second direction B. The DBS common electrode trace 1 and the plurality of clock signal traces 2 may be located at the same layer, that is, the DBS common electrode trace 1 and the plurality of clock signal traces 2 may be located at the first metal layer of the display panel.

The display panel also includes a plurality of clock signal transfer lines 3, a number of the plurality of clock signal transfer lines 3 and a number of the plurality of clock signal traces 2 are the same, and the plurality of clock signal transfer lines 3 and the plurality of clock signal traces 2 are in a one-to-one correspondence, wherein each of the clock signal transfer lines 3 is electrically connected to its corresponding clock signal trace 2. The plurality of clock signal transfer lines 3 and the plurality of clock signal traces 2 are located at different layers, and the plurality of clock signal transfer lines 3 may be located in the second metal layer of the display panel. An insulating layer can be arranged between the first metal layer and the second metal layer, the insulating layer is provided with via holes, the via holes are filled with conductive material, and each of the clock signal transfer lines 3 passes through the conductive material in the via hole to electrically connect to its corresponding clock signal trace 2.

After each of the clock signal transfer lines 3 is electrically connected to its corresponding clock signal trace 2, it extends in the first direction A through the routing area 12, and continues to extend to the GOA unit area 11 in the first direction A, so as to electrically connect to GOA units in the GOA unit area 11, so that each of the clock signal traces 2 is electrically connected to the GOA unit through its corresponding clock signal transfer line 3.

Since the plurality of clock signal traces 2 are arranged along the first direction A, distances between the plurality of clock signal traces 2 and the GOA unit area 11 are different, and if the plurality of clock signal transfer lines 3 are arranged in a straight line, it will cause a difference in length between the clock signal transfer lines 3, wherein the clock signal transfer line 3 connected to the clock signal trace 2 near the GOA unit area 11 is shorter, and the clock signal transfer line 3 connected to the clock signal trace 2 far away from the GOA unit area 11 is longer. That is, there is a large difference in lengths between the clock signal traces that transmit clock signals (including the clock signal traces 2 and the clock signal transfer lines 3 connected to the clock signal traces 2), which in turn leads to a difference in resistance between the clock signal traces, and this is prone to produce horizontal line defects. Therefore, in the present application, a routing area 12 is provided, and at least one clock signal transfer line 3 is bent and arranged in the routing area 12 to adjust the length of each of the clock signal transfer lines 3 and reduce the difference in resistance between the clock signal traces that transmit clock signals, thereby reducing the occurrence of defective horizontal lines.

Specifically, the clock signal transfer line 3 connected to the clock signal trace 2 farthest from the GOA unit area 11 may not be bent in the routing area 12, that is, the clock signal transfer line 3 may be linear, as shown in FIG. 2. The remaining clock signal transfer lines 3 can be bent and arranged in the routing area 12, and the closer the clock signal traces 2 are to the GOA unit area, the greater a bending length of the clock signal transfer lines 3 connected to the clock signal traces 2 in the routing area 12 is. The bending configuration means that the clock signal transfer lines 3 are bent back and forth along the second direction B in the routing area 12, as long as the clock signal transfer lines 3 do not intersect each other.

Figure 1:
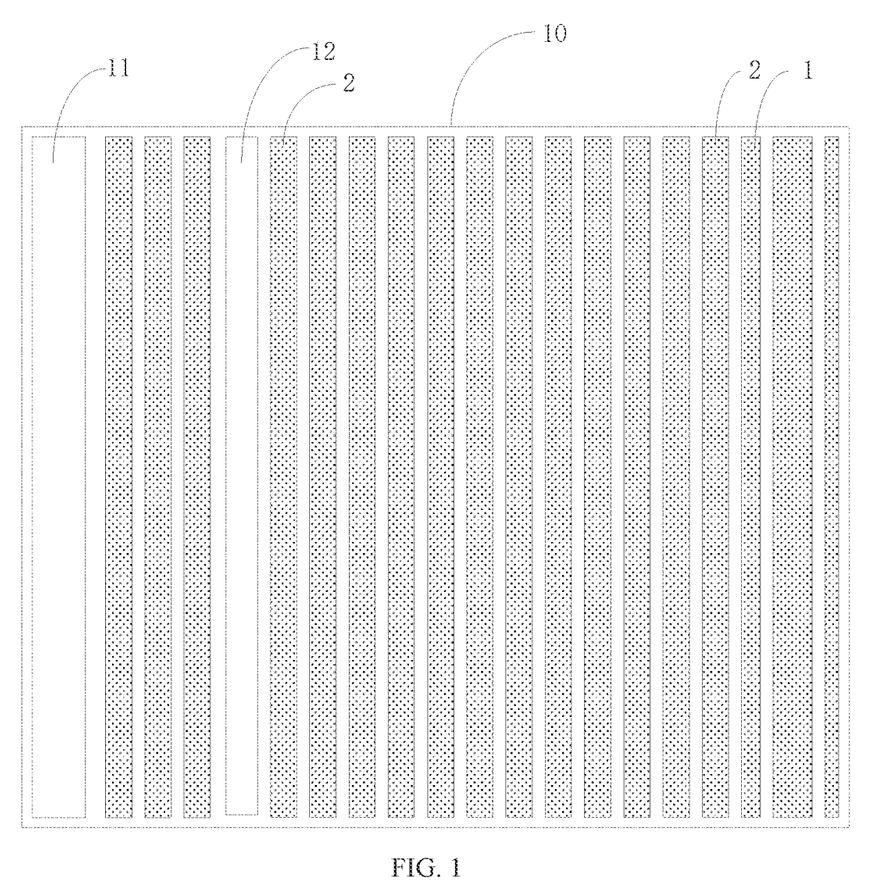
FIG. 1 is a schematic structural diagram of a first metal layer of a display panel in the prior art.

If an additional routing area 12 is added to the non-display area 10, and a design of other traces remains unchanged, such as the DBS common electrode trace 1, the plurality of clock signal traces 2, and the routing area arranged side by side in the non-display area 10, this will cause a width of the non-display area 10 to increase, as shown in FIG. 1, which in turn causes a width of a bezel area of the display panel to increase. In the present application, the DBS common electrode trace 1 is arranged in the routing area 12, and the clock signal transfer lines 3 and the DBS common electrode trace 1 are located at different layers, which will not affect signal transmission of the clock signal transfer lines 3 and the DBS common electrode trace 1, thereby reducing the width of the first wiring area 13, and reducing the width of the non-display area 10, thus reducing a width of the bezel of the display panel.

Since each of the clock signal transfer lines 3 extends through the routing area 12 along the first direction A, and the DBS common electrode trace 1 is located in the routing area 12 and extends along the second direction B, each of the clock signal transfer lines 3 overlaps the DBS common electrode trace 1 in the routing area 12. This overlap means that an orthographic projection of each of the clock signal transfer lines 3 on the routing area 12 overlaps an orthographic projection of the DBS common electrode trace 1 on the routing area 12, and does not means that the clock signal transfer line 3 covers the DBS common electrode line 1. An overlap area of each of the clock signal transfer lines 3 and DBS common electrode line 1 in the routing area 12 is the same, that is, an overlap area of the orthographic projection of each of the clock signal transfer lines 3 on the routing area 12 and the orthographic projection of the DBS common electrode trace 1 on the routing area 12 is the same. The overlap portion of the clock signal transfer line 3 and the DBS common electrode trace 1 can form a capacitor. By adjusting the overlap area of the clock signal transfer line 3 and the DBS common electrode trace 1, the size of the capacitor can be adjusted to improve the difference in capacitance between the clock signal traces, thereby reducing occurrence of defective horizontal lines.

Figure 3:
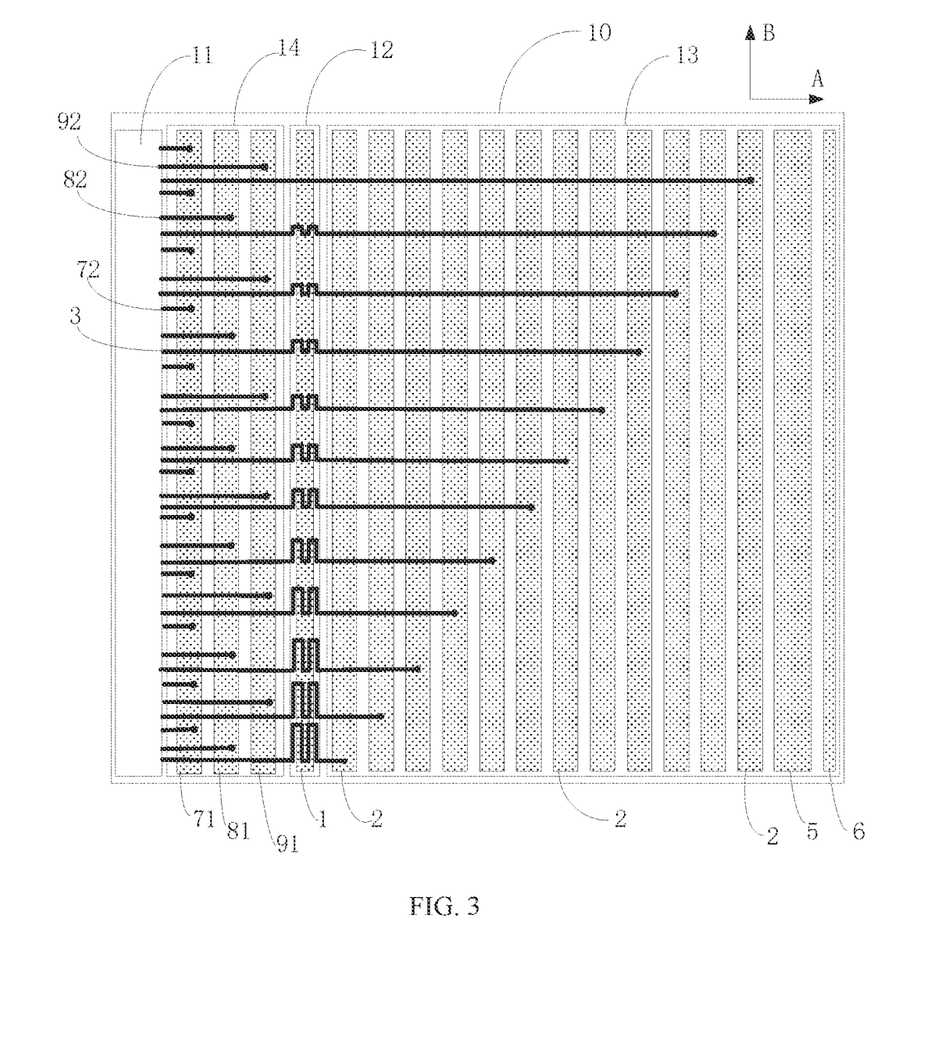
FIG. 3 is a schematic diagram of a first structure of a non-display area of the display panel provided by an embodiment of the present application.

The orthographic projection of the DBS common electrode trace 1 on the routing area 12 can partially cover the routing area 12. The bending lengths of the different clock signal transition lines 3 in the routing area 12 can be different, but the overlap area between each of the clock signal transition lines 3 and the DBS common electrode trace 1 in the routing area 12 can be the same, as shown in FIG. 3.

The orthographic projection of the DBS common electrode trace 1 on the routing area 12 can completely cover the routing area 12, and the DBS common electrode trace 1 is provided with a hollow area. The closer the clock signal traces 2 are to the GOA unit area 11, the larger an overlap area between the clock signal transfer lines 3 connected to the clock signal traces 2 and the hollow area is. Alternatively, the clock signal transfer line 3 connected to the clock signal trace 2 farthest from the GOA unit area 11 may not overlap with the hollow area, and the other clock signal transfer lines 3 are bent and arranged in the routing area 12 and can all overlap with the hollow area. Moreover, the longer the bending length of the clock signal transfer line 3 in the routing area 12, the larger the overlap area between the clock signal transfer line 3 and the hollow area is, so as to adjust the overlap area between each of the clock signal transfer lines 3 and the DBS common electrode trace 1, thereby reducing the difference in capacitance between the clock signal traces.

Figure 4:
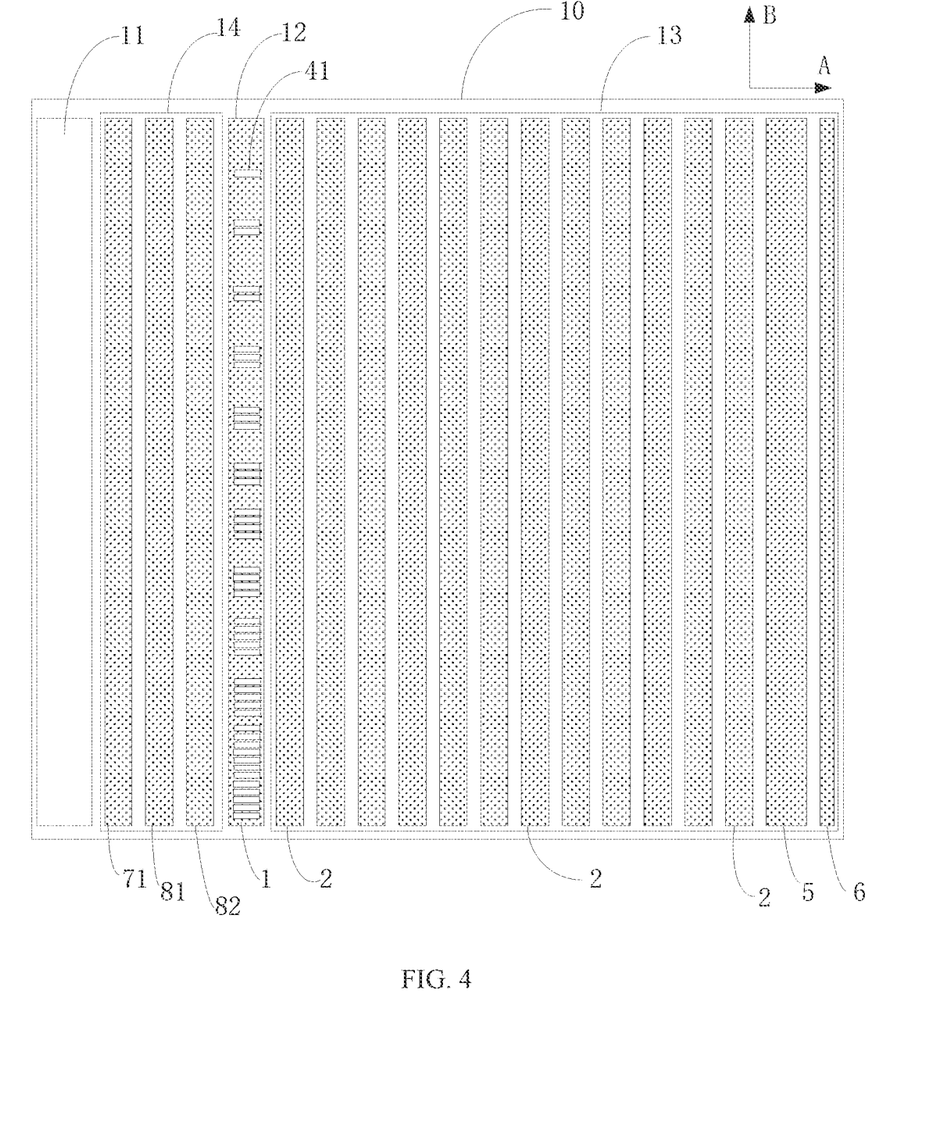
FIG. 4 is a schematic diagram of a second structure of the first metal layer of the display panel provided by an embodiment of the present application.

In one embodiment, as shown in FIG. 4, the hollow area includes a plurality of hollow structures 41 arranged along the second direction B. The closer the clock signal trace 2 to the GOA unit area 11, the more the number of hollow structures 41 corresponding to the clock signal transfer lines 3 connected to the clock signal trace 2 is, and a shape and size of each hollow structure 41 may be the same. Alternatively, the clock signal transfer line 3 connected to the clock signal trace 2 farthest from the GOA unit area 11 may not correspond to the hollow structure 41, and the remaining clock signal transfer lines 3, that is, each of the clock signal transfer lines 3 that is bent and arranged in the routing area 12 can correspond to at least one hollow structure 41. In the routing area 12, the longer the bending length of the clock signal transfer line 3, the larger the number of the corresponding hollow structure 41 is, that is, the longer the bending length of the clock signal transfer line 3 in the routing area 12, the larger the number of hollow structures 41 overlapping with it is.

Figure 5:
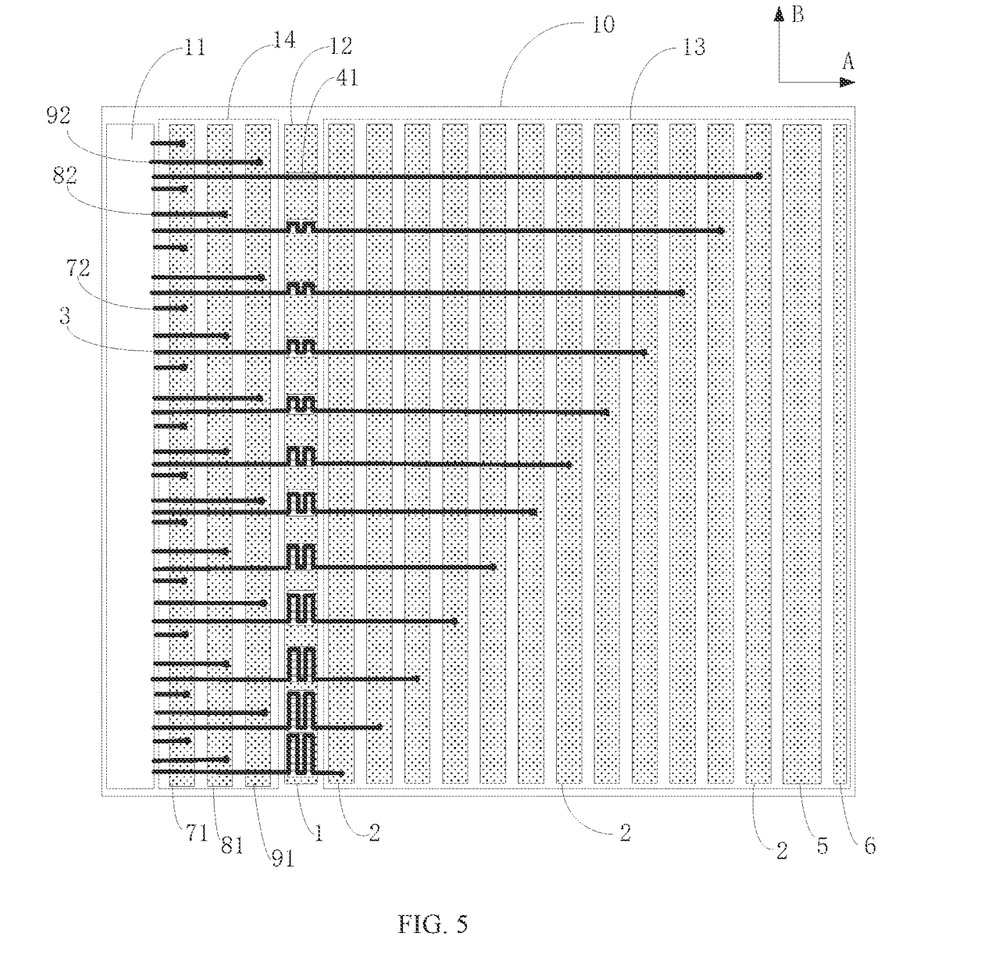
FIG. 5 is a schematic diagram of a second structure of the non-display area of the display panel provided by an embodiment of the present application.

As shown in FIG. 5, from top to bottom, the bending length of the clock signal transfer line 3 in the routing area 12 becomes increasingly longer, so from top to bottom, the distribution density of the hollow structure 41 becomes larger and larger, so that the longer the bending length of the clock signal transfer line 3 in the routing area 12 is, the larger the overlap area with the hollow structure 41 is, so as to reduce the difference in capacitance between the clock signal traces.

Figure 6:
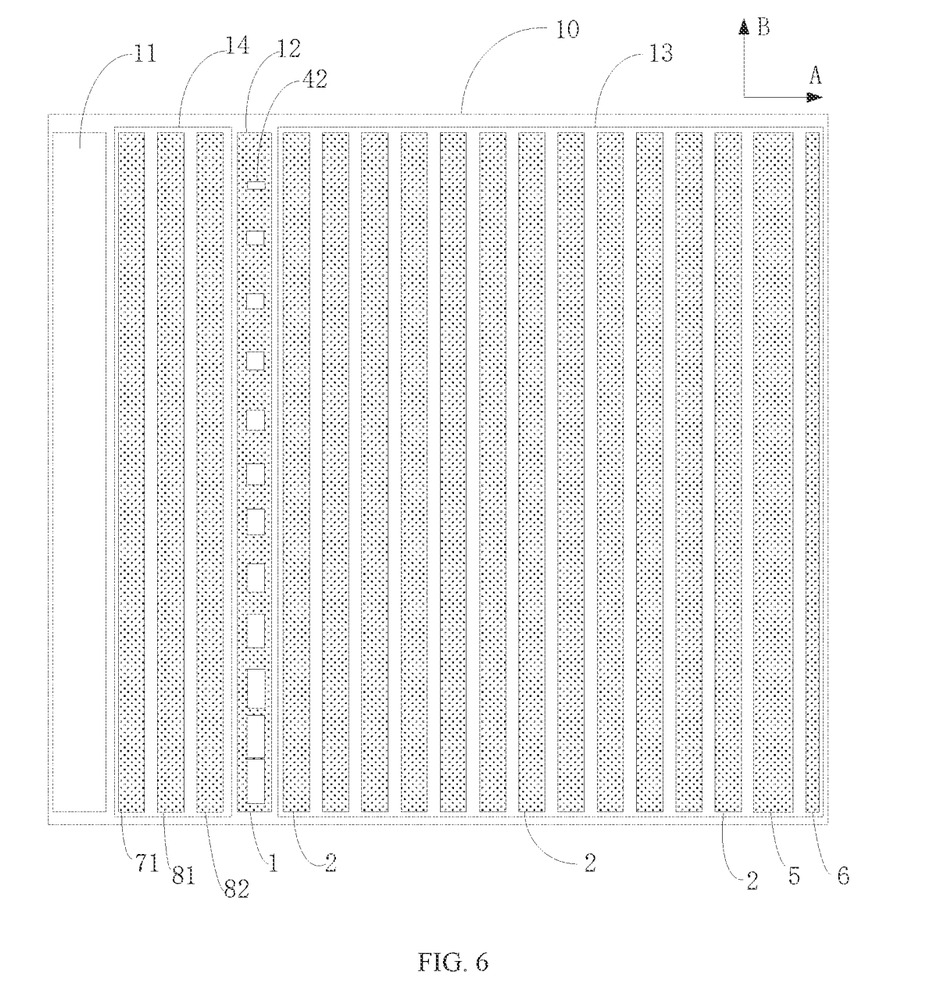
FIG. 6 is a schematic diagram of a third structure of the first metal layer of the display panel provided by an embodiment of the present application.
Figure 7:
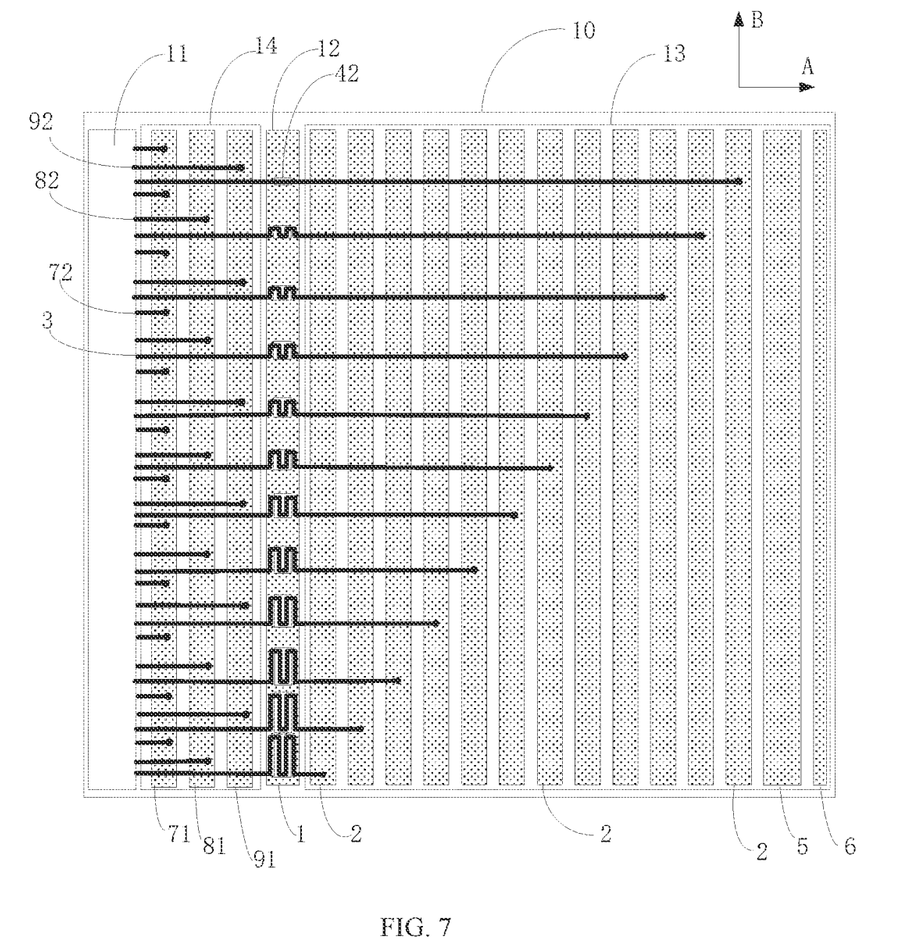
FIG. 7 is a schematic diagram of a third structure of the non-display area of the display panel provided by an embodiment of the present application.

In another embodiment, as shown in FIG. 6, the hollow area includes a plurality of hollow structures 42 arranged along the second direction B. The closer the clock signal trace 2 to the GOA unit area 11 is, the larger the area of the hollow structure 42 corresponding to the clock signal transfer line 3 connected thereto, and the size of each hollow structure 41 may be different. Alternatively, the clock signal transfer line 3 connected to the clock signal trace 2 farthest from the GOA unit area 11 may not correspond to the hollow structure 41, and the remaining clock signal transfer lines 3, that is, each of the clock signal transfer lines 3 that is bent and arranged in the routing area 12 can correspond to a hollow structure 42. The longer the bending length of the clock signal transfer line 3 in the routing area 12, the larger the area of the hollow structure 42 corresponding to the clock signal transfer line 3 is. As shown in FIG. 7, from top to bottom, the bending length of the clock signal transfer lines 3 in the routing area 12 becomes increasingly longer. Therefore, from top to bottom, the area of the hollow structures 42 becomes larger and larger, so that the longer the bending length of the clock signal transfer line 3 in the routing area 12, the larger the overlap area between the clock signal transfer line 3 and the hollow structure 42 is, so as to reduce the difference in capacitance between the clock signal traces.

Furthermore, as shown in FIGS. 2 to 7, the display panel further includes a color filter (CF) common electrode trace 5 and a color filter (CF) common electrode feedback trace 6. The CF common electrode trace 5 is located in the first wiring area 13, and the CF common electrode trace 5 is located on a side of the plurality of clock signal traces 2 away from the DBS common electrode trace 1, wherein the CF common electrode trace 5 extends along the second direction B. The CF common electrode feedback trace 6 is located in the first wiring area 13, the CF common electrode feedback trace 6 is located on a side of the DBS common electrode trace 1 away from the clock signal trace 2, and the CF common electrode feedback trace 6 extends along the second direction B. The CF common electrode trace 5 and the CF common electrode feedback trace 6 can be arranged at the same layer as the plurality of clock signal traces 2, that is, the CF common electrode trace 5 and the CF common electrode feedback trace 6 may be located at the first metal layer.

Furthermore, as shown in FIGS. 2 to 7, the non-display area 10 further includes a second wiring area 14 located between the GOA unit area 11 and the routing area 12. The display panel further includes a voltage trace 71 and at least one voltage transfer line 72. The voltage trace 71 is located in the second wiring area 14, that is, the voltage trace 71 is located between the GOA unit and the DBS common electrode trace 1, and the voltage trace 71 extends along the second direction B. The at least one voltage transfer line 72 is respectively connected to the voltage trace 71, and each voltage transfer line 72 extends to the GOA unit area 11 along the first direction A to electrically connect to the GOA unit, so that the voltage trace 71 is electrically connected to the GOA unit through the at least one voltage transfer line 72. The voltage trace 71 and the voltage transfer line 72 are located at different layers, and the voltage trace 71 can be located at the same layer as the plurality of clock signal traces 2, that is, the voltage trace 71 can be located at the first metal layer, and the voltage transfer line 72 can be located at the same layer as the plurality of clock signal transfer lines 3, that is, the voltage transfer lines 72 can be located in the second metal layer. The insulating layer between the first metal layer and the second metal layer can be provided with a plurality of via holes, the via holes are filled with conductive material, and at least one voltage transfer line 72 can be electrically connected to the voltage trace 71 through the conductive material in the via holes. The voltage trace 71 and the voltage transfer line 72 are configured to transmit low-voltage signals to the GOA unit.

Furthermore, as shown in FIGS. 2 to 7, the display panel further includes a positive signal trace 81, at least one positive signal transfer line 82, a negative signal trace 91, and at least one negative signal transfer line 92. The positive signal trace 81 and the negative signal trace 91 are both located in the second wiring area 14 and extend along the second direction B. The positive signal trace 81 is connected to the at least one positive signal transfer line 82, and each positive signal transfer line 82 extends to the GOA unit area 11 along the first direction A, so as to electrically connect to the GOA unit, so that the positive signal trace 81 is electrically connected to the GOA unit through at least one positive signal transfer line 82. The positive signal transfer line 82 and the positive signal trace 81 are located at different layers, and the positive signal trace 81 may be located at the same layer as the plurality of clock signal traces 2, that is, the positive signal trace 81 may be located at the first metal layer. The positive signal transfer line 82 may be located at the same layer as the plurality of clock signal transfer lines 3, that is, the positive signal transfer line 82 may be located in the second metal layer. The insulating layer between the first metal layer and the second metal layer may be provided with a plurality of via holes, the via holes are filled with conductive material, and the positive signal transfer line 82 can be electrically connected to the positive signal trace 81 through the conductive material in the via hole. The positive signal trace 81 and the positive signal transfer line 82 are configured to transmit the positive signal to the GOA unit.

The negative signal trace 91 is connected to the at least one negative signal transfer line 92, and each negative signal transfer line 92 extends along the first direction A to the GOA unit area 11 to electrically connect to the GOA unit, so that the negative signal trace 91 is electrically connected to the GOA unit through at least one negative signal transfer line 92. The negative signal transfer line 92 and the negative signal trace 91 are located at different layers, and the negative signal trace 91 may be located at the same layer as the plurality of clock signal traces 2, that is, the negative signal trace 91 may be located at the first metal layer. The negative signal transfer line 92 may be located at the same layer as the plurality of clock signal transfer lines 3, that is, the negative signal transfer line 92 may be located in the second metal layer. The insulating layer between the first metal layer and the second metal layer may be provided with a plurality of via holes, the via holes are filled with conductive material, and the negative signal transfer line 92 can be electrically connected to the negative signal trace 91 through the conductive material in the via hole. The negative signal trace 91 and the negative signal transfer line 92 are configured to transmit negative signals to the GOA unit.

When the display panel is an 8K display panel, the display panel includes twelve clock signal traces 2, twelve clock signal transfer lines 3, twelve voltage transfer lines 72, six positive signal transfer lines 82, and six negative signal transfer line 92. The twelve clock signal traces 2 and twelve clock signal transfer lines 3 are electrically connected to each other in a one-to-one correspondence, and the twelve clock signal transfer lines 3 are respectively electrically connected to the GOA units. The twelve voltage transfer lines 72 are respectively electrically connected to the voltage trace 71, and the twelve voltage transfer lines 72 are also respectively electrically connected to the GOA units; the six positive signal transfer lines 82 are respectively electrically connected to the positive signal trace 81, and the six positive signal transfer lines 82 are also electrically connected to the GOA units; the six negative signal transfer lines 92 are respectively electrically connected to the negative signal traces 91, and the six negative signal transfer lines 92 are also respectively connected to the GOA units.

Figure 8:
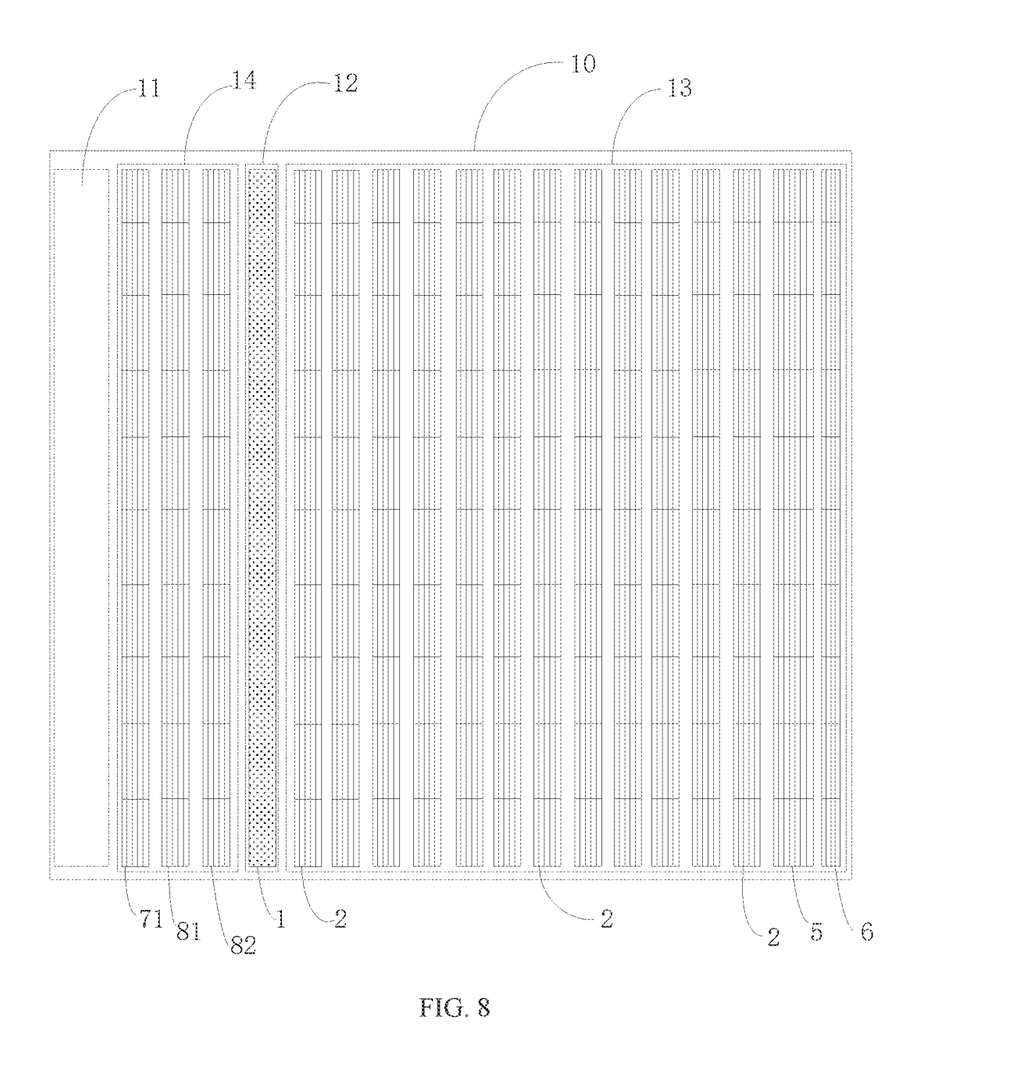
FIG. 8 is a schematic diagram of a fourth structure of the first metal layer of the display panel provided by an embodiment of the present application.

Further, each of the clock signal traces 2, the CF common electrode traces 5, the CF common electrode feedback traces 6, the voltage traces 71, the positive signal traces 81, and the negative signal traces 91 may be a solid line, as shown in FIG. 2 to FIG. 7. Each of the clock signal trace 2, the CF common electrode trace 5, the CF common electrode feedback trace 6, the voltage trace 71, the positive signal trace 81, and the negative signal trace 91 may include a plurality of sub-lines that are cross-connected, and the plurality of sub-lines form a mesh structure, as shown in FIG. 8. The display panel also includes an array substrate (not shown), a color filter substrate (not shown), and a liquid crystal layer (not shown). When the liquid crystal layer is encapsulated, a sealant needs to be arranged on a peripheral side of the liquid crystal layer, and the array substrate and the color filter substrate are fixed by the sealant to encapsulate the liquid crystal layer between the array substrate and the color filter substrate. The clock signal trace 2, the CF common electrode trace 5, the CF common electrode feedback trace 6, the voltage trace 71, the positive signal trace 81, and the negative signal trace 91 are arranged on the array substrate, and these traces are set as mesh structures, which help ultraviolet light pass through these traces to irradiate the sealant and realize the fixation of the sealant.

In summary, in an embodiment of the present application, a dataline black matrix less (DBS) common electrode trace is arranged in the routing area and extending along a second direction; a plurality of clock signal traces are arranged in the first wiring area along a first direction, wherein each of the clock signal traces extends along the second direction; and a plurality of clock signal transfer lines are connected to the plurality of clock signal traces in a one-to-one correspondence, wherein each of the clock signal transfer lines passes through the routing area and extends to the GOA unit area along the first direction, and at least one of the clock signal transfer lines is bent and arranged in the routing area, such that a difference in resistance between the clock signal traces is reduced through bending the clock signal transfer lines. Meanwhile, the DBS common electrode trace is located in the routing area to prevent disposing the DBS common electrode traces separately to increase routing space, thereby reducing a width of a bezel of a display panel.

While the disclosure has been described by way of example and in terms of the preferred embodiments, it is to be understood that the disclosure is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display panel, comprising a non-display area, the non-display area comprising a gate driver on array (GOA) unit area, a routing area, and a first wiring area arranged in a first direction; and
   the display panel comprising:
   a dataline black matrix less (DBS) common electrode trace arranged in the routing area and extending along a second direction;
   a plurality of clock signal traces arranged in the first wiring area along the first direction, wherein each of the clock signal traces extends along the second direction; and
   a plurality of clock signal transfer lines connected to the plurality of clock signal traces in a one-to-one correspondence, wherein each of the clock signal transfer lines passes through the routing area and extends to the GOA unit area along the first direction, and at least one of the clock signal transfer lines is bent and arranged in the routing area,
   wherein the plurality of clock signal transfer lines, the DBS common electrode trace, and the plurality of clock signal traces are arranged at different layers;
   wherein an overlap area between each of the clock signal transfer lines and the DBS common electrode trace in the routing area is the same.

2. The display panel according to claim 1, wherein the closer the clock signal traces are to the GOA unit area, the greater a bending length of the clock signal transfer lines connected to the clock signal traces in the routing area is.

3. The display panel according to claim 1, wherein the display panel further comprises a color filter (CF) common electrode trace and a color filter (CF) common electrode feedback trace; and
   wherein the CF common electrode trace and the CF common electrode feedback trace are both arranged in the first wiring area and extend along the second direction.

4. The display panel according to claim 3, wherein each of the CF common electrode trace and the CF common electrode feedback trace comprises a plurality of sub-lines that are cross-connected, and the plurality of sub-lines form a mesh structure.

5. The display panel according to claim 3, wherein the CF common electrode trace, the CF common electrode feedback trace, and the clock signal traces are arranged at a same layer.

6. The display panel according to claim 1, wherein the non-display area further comprises a second wiring area located between the GOA unit area and the routing area;
wherein the display panel further comprises a voltage trace and a voltage transfer line; and
wherein the voltage trace is arranged in the second wiring area and extends along the second direction, the voltage transfer line is connected to the voltage trace and extends to the GOA unit area along the first direction, and the voltage trace and the voltage transfer line are arranged at different layers.

7. The display panel according to claim 6, wherein the display panel further comprises a positive signal trace, a positive signal transfer line, a negative signal trace, and a negative signal transfer line;
wherein the positive signal trace and the negative signal trace are both arranged in the second wiring area and extend along the second direction; and
wherein the positive signal transfer line is connected to the positive signal trace and extends to the GOA unit area along the first direction, and the positive signal transfer line and the positive signal trace are arranged at different layers; and
wherein the negative signal transfer line is connected to the negative signal trace and extends to the GOA unit area along the first direction, and the negative signal trace and the negative signal transfer line are arranged at different layers.

8. The display panel according to claim 7, wherein each of the positive signal trace and the negative signal trace comprises a plurality of sub-lines that are cross-connected, and the plurality of sub-lines form a mesh structure.

9. The display panel according to claim 7, wherein the positive signal trace, the negative signal trace, and the clock signal traces are located at a same layer, and the positive signal transfer line, the negative signal transfer line, and the clock signal transfer lines are located at a same layer.

10. The display panel according to claim 6, wherein the voltage trace comprises a plurality of sub-lines that are cross-connected, and the plurality of sub-lines form a mesh structure.

11. The display panel according to claim 6, wherein the voltage trace and the clock signal traces are located at a same layer, and the voltage transfer line and the clock signal transfer lines are located at a same layer.

12. The display panel according to claim 1, wherein the clock signal traces comprise a plurality of sub-lines that are cross-connected, and the plurality of sub-lines form a mesh structure.

13. The display panel according to claim 1, wherein the DBS common electrode trace and the plurality of clock signal traces are arranged at a same layer.

14. A display panel, comprising a non-display area, the non-display area comprising a gate driver on array (GOA) unit area, a routing area, and a first wiring area arranged in a first direction; and the display panel comprising:
a dataline black matrix less (DBS) common electrode trace arranged in the routing area and extending along a second direction;
a plurality of clock signal traces arranged in the first wiring area along the first direction, wherein each of the clock signal traces extends along the second direction; and
a plurality of clock signal transfer lines connected to the plurality of clock signal traces in a one-to-one correspondence, wherein each of the clock signal transfer lines passes through the routing area and extends to the GOA unit area along the first direction, and at least one of the clock signal transfer lines is bent and arranged in the routing area,
wherein the plurality of clock signal transfer lines, the DBS common electrode trace, and the plurality of clock signal traces are arranged at different layers;
wherein an orthographic projection of the DBS common electrode trace on the routing area completely covers the routing area, and the DBS common electrode trace is provided with a hollow area; and
wherein the closer the clock signal traces are to the GOA unit area, the larger an overlap area between the clock signal transfer lines connected to the clock signal traces and the hollow area is.

15. The display panel according to claim 14, wherein the hollow area comprises a plurality of hollow structures arranged along the second direction, and each of the clock signal transfer lines corresponds to at least one of the hollow structures; and
wherein the closer the clock signal traces are to the GOA unit area, the greater a number of the hollow structures corresponding to the clock signal transfer lines connected to the clock signal traces is.

16. The display panel according to claim 14, wherein the hollow area comprises a plurality of hollow structures arranged along the second direction, and each of the clock signal transfer lines corresponds to one of the hollow structures; and
wherein the closer the clock signal traces are to the GOA unit area, the larger an area of the hollow structures corresponding to the clock signal transfer lines connected to the clock signal traces is.

* * * * *